US011264902B2

(12) United States Patent
Shao et al.

(10) Patent No.: US 11,264,902 B2
(45) Date of Patent: Mar. 1, 2022

(54) INDUCTOR CURRENT BASED MODE CONTROL FOR BUCK-BOOST CONVERTERS

(71) Applicant: Analog Devices International Unlimited Company, Limerick (IE)

(72) Inventors: Bin Shao, Andover, MA (US); Danzhu Lu, Shanghai (CN)

(73) Assignee: Analog Devices International Unlimited Company, Co. Limerick (IE)

( * ) Notice: Subject to any disclaimer, the term of this patent is extended or adjusted under 35 U.S.C. 154(b) by 783 days.

(21) Appl. No.: 15/072,844

(22) Filed: Mar. 17, 2016

(65) Prior Publication Data
US 2017/0257031 A1   Sep. 7, 2017

Related U.S. Application Data

(63) Continuation of application No. PCT/CN2016/075318, filed on Mar. 2, 2016.

(51) Int. Cl.
H02M 1/08 (2006.01)
H02M 3/158 (2006.01)
H02M 1/00 (2006.01)

(52) U.S. Cl.
CPC ........ *H02M 3/1582* (2013.01); *H02M 1/0009* (2021.05)

(58) Field of Classification Search
CPC ....... H02M 2003/1552; H02M 3/1582; H02M 3/1584; H02M 2003/1582;
(Continued)

(56) References Cited

U.S. PATENT DOCUMENTS

2007/0290667 A1* 12/2007 Nagai ................. H02M 3/1582
                                                                      323/284
2008/0157742 A1*  7/2008 Martin ................ H02M 3/1584
                                                                      323/284
(Continued)

FOREIGN PATENT DOCUMENTS

CN         103856043 A      6/2014
CN         105244848 A      1/2016
(Continued)

OTHER PUBLICATIONS

"Chinese Application Serial No. 201611144078.6, Office Action dated Nov. 2, 2018", w/ English Translation, 12 pgs.

*Primary Examiner* — Thienvu V Tran
*Assistant Examiner* — Lorena D Bruner
(74) *Attorney, Agent, or Firm* — Schwegman Lundberg & Woessner, P.A.

(57) ABSTRACT

Apparatus and methods for controlling voltage converter are provided. In an example, a switched-mode DC-DC voltage converter can include an inductor, at least four switches coupled to the inductor and configured to direct current through the inductor to provide a desired output voltage at an output voltage terminal of the voltage converter using an input voltage supply and a ground reference of the converter, and a controller circuit, configured to receive an indication of inductor current through the inductor and to use the slope of the inductor current to control a change between two operating modes of a group of operating modes that include a boost operating mode, a buck operating mode, and a buck-boost operating mode.

17 Claims, 7 Drawing Sheets

(58) Field of Classification Search
CPC ... H02M 2003/1584; Y02B 20/34–348; H05B 33/00–28
USPC .................................... 323/222, 282, 351
See application file for complete search history.

(56) References Cited

U.S. PATENT DOCUMENTS

| | | | |
|---|---|---|---|
| 2009/0251122 A1 | 10/2009 | Singnurkar | |
| 2011/0018515 A1* | 1/2011 | McCloy-Stevens | H02M 3/1588 323/284 |
| 2012/0126777 A1* | 5/2012 | Motegi | H02M 3/1582 323/311 |
| 2013/0328534 A1* | 12/2013 | Hsieh | G05F 3/02 323/271 |
| 2014/0084882 A1* | 3/2014 | Namekawa | H02M 3/1582 323/271 |
| 2015/0162815 A1* | 6/2015 | Mikami | H02M 3/1582 307/9.1 |
| 2015/0372594 A1* | 12/2015 | Mednik | H02M 1/08 323/299 |
| 2016/0105110 A1* | 4/2016 | Houston | H02M 3/1582 323/271 |
| 2017/0040883 A1* | 2/2017 | Hu | H02M 3/156 |

FOREIGN PATENT DOCUMENTS

| | | |
|---|---|---|
| CN | 107154736 A | 9/2017 |
| JP | 2014064417 A | 4/2014 |

\* cited by examiner

|  | S1 | S2 | S3 | S4 | mode |
|---|---|---|---|---|---|
| Φ1 | OFF | OFF | OFF | - | - |
| Φ2 | ON | OFF | ON | OFF | - |
| Φ3 | ON | OFF | OFF | ON | 0 |
| Φ4 | OFF | ON | OFF | ON | - |
| Φ5 | ON | OFF | OFF | ON | 1 |

INDUCTOR CURRENT BASED MODE CONTROL FOR BUCK-BOOST CONVERTERS

CLAIM OF PRIORITY

This application is a continuation under 35 U.S.C. § 111(a) and claims benefit of priority to International Patent Application Serial No. PCT/CN2016/075318, filed on Mar. 2, 2016, which is hereby incorporated by reference herein in its entirety.

BACKGROUND

DC-to-DC voltage conversion is useful in electronic devices, especially mobile devices that rely on a battery or similar fixed or rechargeable energy source for power. Voltage conversion can help generate steady output voltage levels from input voltage levels that can vary substantially as power is consumed from the energy source or as the energy source is being charged. Some voltage converters use an inductor to provide a relatively stable output voltage. A buck mode can be used to provide an output voltage that is lower than the input voltage. A boost mode can be used to provide an output voltage that is higher than the input voltage. Switched transistors can be used to direct current through the inductor.

In a windowed-type control, if the input voltage (Vin) is larger than the output voltage (Vout) plus a threshold voltage (Vth) of a switch transistor, the converter operates in a buck mode. If Vin is smaller than Vout−Vth, the converter operates in a boost mode. In some converters, if Vin is between Vout+Vth and Vout−Vth, the converter can operate in a buck-boost mode. Windowed controllers require that the comparators monitoring the relative levels of Vin and Vout always be on. Over time, the power used by the comparators can be substantial. This can substantially shorten operating intervals between battery charge events.

Windowless control can be used by a voltage convertor to provide only a buck operating mode or a boost operating mode. Windowless control does not require the comparators associated with the windowed-type control. However, windowless control is slow to respond to sudden changes in either input voltage or the output voltage, such as due to current demand.

Overview

This document describes a voltage converter and techniques that do not require the comparators associated with the windowed-type control. Instead, an indication of inductor current through the inductor and the slope of the inductor current can be used to control a change between two of the following operating modes: a boost operating mode, a buck operating mode, and a buck-boost operating mode.

In an example, a switched-mode DC-DC voltage converter can include an inductor. At least four switches can be coupled to the inductor and configured to direct current through the inductor to provide a desired output voltage at an output voltage terminal of the voltage converter using an input voltage supply and a ground reference of the converter. A controller circuit can be configured to receive an indication of inductor current through the inductor and to use the slope of the inductor current to control a change between two operating modes of a group of operating modes that include a boost operating mode, a buck operating mode, and a buck-boost operating mode.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized that a new voltage controller control technique can use the slope of the increasing or decreasing inductor current flow to provide an indication of the relative level of the input voltage with respect to the output voltage. For example, in buck mode, a rising slope of inductor current is related to Vin−Vout, where Vin is the input voltage to the converter and Vout is the output voltage of the converter. If the inductor current slope is small, Vin is approaching the same value as Vout, and if less than a threshold value, the converter can be smoothly changed from the buck mode to a boost mode of operation. In boost mode, a falling slope of the inductor current is related to Vin−Vout. If the falling or negative slope of the inductor current is small, the converter can smoothly transition to buck-boost mode, and if the slope of the inductor current is positive, the converter can smoothly transition to a buck mode of operation. In addition, sensing the current slope can be done very quickly such that sudden changes in input voltage levels or output voltage levels can be detected. This can allow the mode of the converter to be changed in less than one switching cycle which can be on the order of a microsecond and possibly even several hundred nanoseconds.

Figure 1:
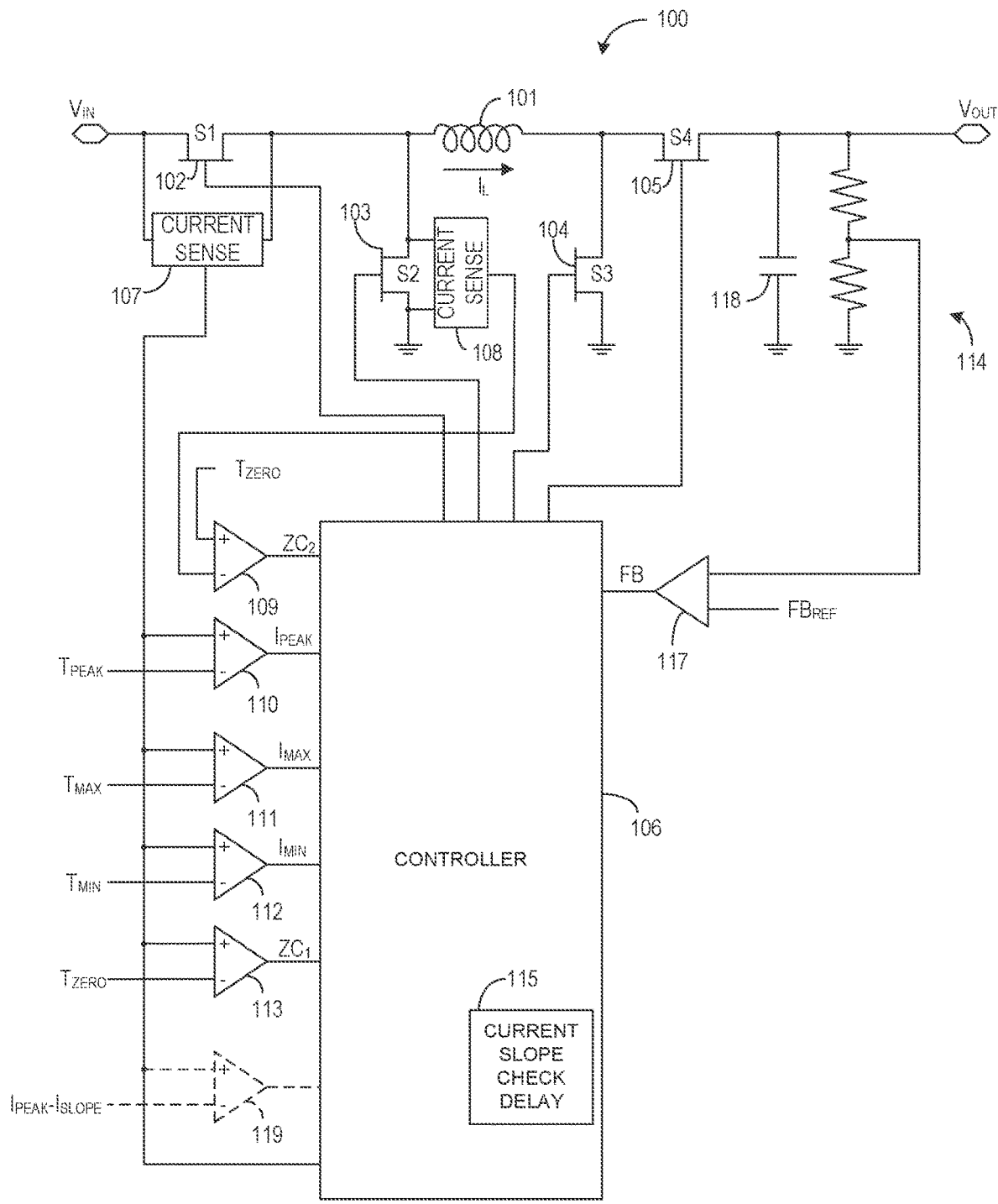
FIG. 1 illustrates generally an example of a voltage converter.

FIG. 1 illustrates an example of a voltage converter 100. The voltage converter 100 can include an inductor 101. A first transistor 102 can be coupled between an input voltage terminal ($V_{IN}$) and a first node of the inductor 101. A second transistor 103 can be coupled between the first node of the inductor 101 and a reference plane such as ground. A third transistor 104 can be coupled between a second node of the inductor 101 and the reference plane. A fourth transistor 105 can be coupled between the second node of the inductor 101 and an output voltage terminal ($V_{OUT}$). A control circuit 116 can be configured for sensing one or more of various operating parameters and for controlling one or more of the first, second, third and fourth transistors 102, 103, 104, and 105.

The control circuit 116 can include a first current sensor 107 such as for measuring inductor current via the first transistor 102 or a second current sensor 108 such as for measuring inductor current via the second transistor 103. The current sensors 107, 108 can supply an indication of inductor current to one or several comparators 109, 110, 111, 112, and 113. The comparators 109, 110, 111, 112, 113 can be enabled during certain machine states of the converter 100 when needed and can be disabled to conserve power when machine control is outside of those machine states. The control circuit 116 can include a controller 106 or processor such as to receive the output of the comparators 109, 110, 111, 112, 113 as well as other processing circuits of the control circuit 116 and to control the first, second, third and fourth transistors 102, 103, 104, and 105. The other processing circuits can include a feedback circuit 114 configured to receive a representation of the output voltage (VOUT) and to provide feedback information (FB) to the controller 116. The feedback circuit 114 can receive a feedback reference ($FB_{REF}$) and the feedback information (FB) can include information indicative of comparison or error between the representation of the output voltage (VOUT) and the feedback reference ($FB_{REF}$). In certain examples, the feedback circuit can include an active feedback device 117 such as a comparator or an amplifier.

The controller 116 can also include a current slope check delay circuit 115 for timing reception of one or more of the comparators 109, 110, 111, 112, 113. The current slope check delay interval of the circuit can be based on one or more characteristics of the inductor 101 such as the inductance of the inductor and the peak current of the inductor.

The comparators of the control circuit can include a peak current comparator 110 such as to indicate whether the inductor current has reached at least a peak current threshold ($T_{PEAK}$), a maximum current comparator 111 to indicate if the inductor current has reached a maximum current threshold ($T_{MAX}$), and a minimum current comparator 112 to indicate if the inductor current has fallen to at least a minimum current threshold ($T_{MIN}$). The control circuit 116 can also include two zero current comparators 109, 113 such as to provide an indication if the inductor current has fallen at least to a zero-current threshold $T_{ZERO}$. In certain control examples, the zero-current threshold $T_{ZERO}$ can be set so as to detect a negative current. During converter operation, a first zero current comparator 113 can be enabled when the controller 116 places the first transistor 102 in a low impedance state, and a second zero comparator 109 can be enabled when the controller 116 places the second transistor 103 in a low impedance state. If the current sensors 107, 108 were coupled to different transistors of the converter 100, the associated zero current comparator 109, 113 can be enabled when the corresponding transistor is enabled. As discussed below, a converter employing fast pulse width modulation (FPWM) can include an additional, optional comparator 119. In certain examples, instead of the optional comparator, one of the other comparators, such as the minimum current comparator 112 can be repurpose during some machine states, for example, by adjusting the minimum current threshold ($T_{MIN}$).

Figures 2, 3:
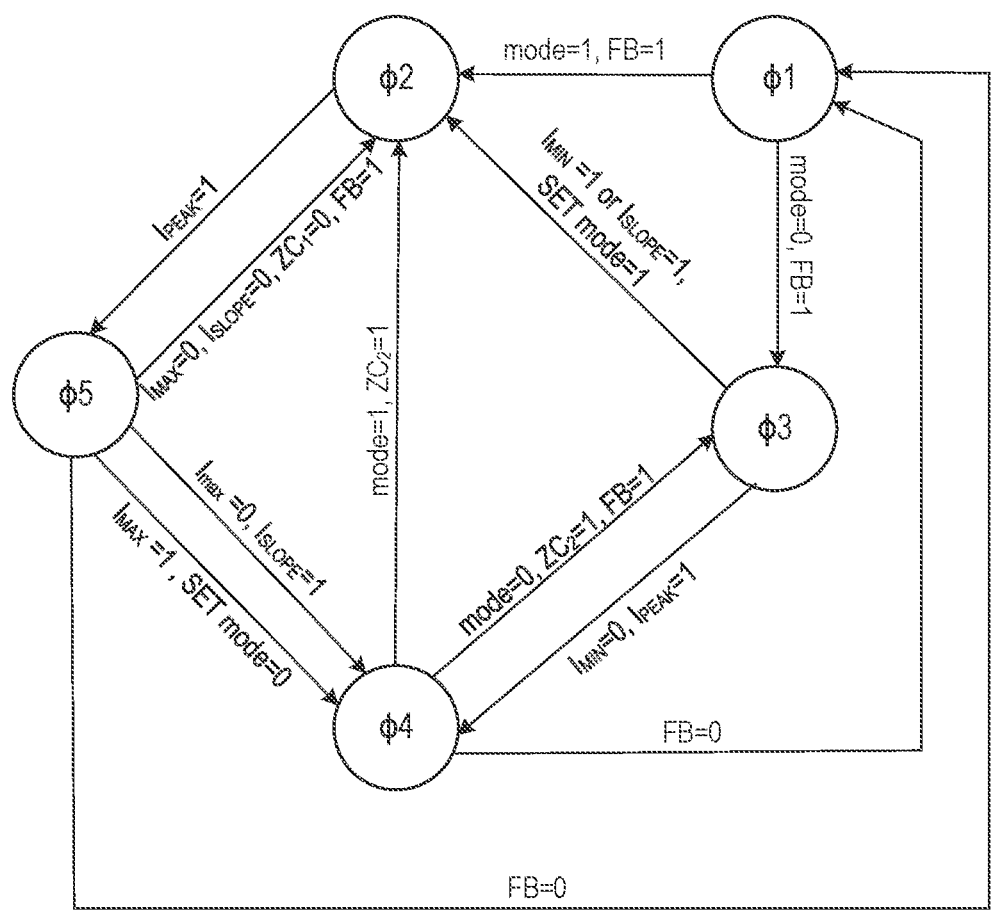
FIG. 2 illustrates generally five machine states associated with controlling the voltage converter of FIG. 1.
FIG. 3 illustrates generally an example hysteretic control method for the voltage converter.

FIG. 2 illustrates generally an example of five machine states associated with controlling the voltage converter of FIG. 1. FIG. 2 is a grid layout that shows a state (ON, OFF) of the switches or transistors 102, 103, 104, 105 (S1, S2, S3, S4) of the converter 100 of FIG. 1 for each of the five machine states ($\Phi1$, $\Phi2$, $\Phi3$, $\Phi4$, $\Phi5$). In the first machine state ($\Phi1$), at least the first second and third transistors (102, 103, 104) are "OFF". As used herein, an "OFF" state of switch or transistor is a state in which the switch is open or the impedance between the switched nodes of the transistor is high enough to inhibit current conduction. An "ON" state of switch or transistor is a state in which the switch is closed or the impedance between the switched nodes of the transistor is low enough to permit current conduction. In the second machine state ($\Phi2$), the first and third transistors 102, 104 are "ON" and the second and fourth transistors (103, 105) are "OFF". In the third machine state ($\Phi3$), the first and fourth transistors 102, 105 are "ON", the second and third transistors 103, 104 are "OFF" and control of the converter is in a buck mode of operation. In the fourth machine state ($\Phi4$), the second and fourth transistors 102, 105 are "ON" and the first and third transistors 103, 104 are "OFF". In the fifth machine state ($\Phi5$), the first and fourth transistors 102, 105 are "ON", the second and third transistors 103, 104 are "OFF" and control of the converter is in a boost mode of operation.

The controller 106 can include a status variable (mode) that indicates a status of the operating mode of the converter. Buck mode can be represented by the status variable being equal to zero. Boost mode or buck-boost mode can be represented by the status variable being equal to one. Optionally, the controller 106 can provide a second status variable indicating when the converter is in either a switching mode of operation or an idle mode of operation. The idle mode of operation can be associated with the first machine state and the switching mode of operation can be associated with the other machine states.

FIG. 3 illustrates generally an example of a hysteretic control method for a voltage converter. In certain examples, the method uses a hysteretic comparator for the feedback device 117. The hysteretic comparator can receive the indication of the output voltage (VOUT) and a feedback reference voltage representative of a nominal desired output voltage (VOUT). The output of the feedback circuit 114, or feedback information (FB) can be used to enable and disable the switching mode of the converter via the first machine state ($\Phi1$). When control of the converter 100 is in the first machine state ($\Phi1$), the output voltage (VOUT) is generally at or near a desired voltage level represented by the feedback reference voltage and the output of the hysteretic comparator can be zero (FB=0). The hysteretic comparator can allow the converter to remain in an idle mode via the first machine state ($\Phi1$) even if the actual output voltage varies either high or low from the desired output voltage. When the feedback voltage drops below a low limit of the hysteretic comparator, the controller 106 can receive the output of the feedback circuit (FB=1) and depending on the last value of the status variable (mode) can transition to either the second machine state ($\Phi2$) if the status variable (mode) is equal to 1, or to the third machine state ($\Phi3$) if the status variable (mode) is equal to 0.

The second machine state ($\Phi2$) allows the inductor to be coupled between the input voltage supply and ground and the controller 106 monitors the output of the peak current comparator 110. The peak current comparator 110 can compare the current signal received from the first current sensor coupled to first transistor 102 to a predetermined peak current threshold. As the current through the inductor, as represented by the sensed current passing through the first transistor 102, reaches the peak current threshold, the peak current comparator 110 can change states and the controller 106 can transition to the fifth machine state ($\Phi5$).

The fifth machine state ($\Phi5$) allows the current stored in the inductor via the second state ($\Phi2$) to be transferred to the output while also coupling the input voltage (VIN) to the output voltage (VOUT) via the inductor. While in the fifth machine state ($\Phi5$), transitioning to the next state can depend on the actual output voltage level and the relative voltage levels of the input voltage (VIN) and the output voltage (VOUT). If the output voltage level rises to the upper hysteretic comparator limit, control of the converter will transition to the first machine state ($\Phi1$). Upon entering the fifth machine state ($\Phi5$), the controller 106 can begin one or more delays including, but not limited to, a maximum inductor current delay and a slope check delay. At the conclusion of the maximum inductor current delay, the output of the maximum inductor current comparator is evaluated. During the fifth machine state ($\Phi5$), the output of the first zero-current comparator 113 is evaluated, and the inductor peak current comparator is disabled.

A second transition path for the converter out of the fifth machine state ($\Phi5$) can proceed if at or after the conclusion of the inductor maximum delay the inductor maximum delay comparator provides an indication that the inductor current is at or beyond the maximum current threshold. If so, the controller 106 can transition to the fourth machine state ($\Phi4$). Upon transitioning to the fourth machine state ($\Phi4$), the status variable (mode) can be changed from a value of 1 to a value of zero, indicating the converter is transitioning from a boost mode of operation (mode=1) to a buck mode of operation (mode=0).

A third transition path for the converter out of the fifth machine state ($\Phi5$) can proceed if at or after the conclusion of the slope check delay, the first zero current comparator 113 provides an indication of whether the inductor current reduced to at or below the inductor zero current threshold. If the inductor current did not reduce to the zero current threshold at the conclusion of the slope check delay, the controller 106 can transition the converter to the fourth machine state ($\Phi4$). This particular check allows transition out of the fifth machine state ($\Phi5$) that would not normally occur. The transition based on the slope check delay indicates that as the converter boosts the output voltage (VOUT) relative to the input voltage (VIN), the input voltage (VIN) is at or near the output voltage (VOUT).

A fourth transition path for operation of the converter out of the fifth machine state ($\Phi5$) and back to the second machine state ($\Phi2$) can proceed if the inductor current reduces to the zero current threshold. The switching between the second machine state ($\Phi2$) and the fifth machine state ($\Phi5$) is a boost mode of operation (mode=1).

The fourth machine state ($\Phi4$) can allow the collapsing magnetic field of the inductor to supplement the electrical charge stored in the output capacitor 118. Although the output voltage (VOUT) can initially rise during this state, if there is some load on the converter, the output voltage (VOUT) typically begins to fall during this state. If the output voltage (VOUT) does rise, such as when the load is light, to the upper hysteretic comparator limit, control of the converter can transition to the first machine state ($\Phi1$). Upon entering the fourth machine state ($\Phi4$), the controller 106 can monitor the output of the second zero current comparator 109. During the fourth machine state the inductor peak current comparator can be disabled.

A second path for transitioning out of the fourth machine state ($\Phi4$) can happen when the status variable (mode) is set to 1 (boost mode) and, if at the end of the zero-current delay, the current through the inductor, as measured via the second transistor 103 has gone to zero. With such conditions, the controller 106 can transition the converter to the second machine state ($\Phi2$). Transition from the second machine state ($\Phi2$) to the fifth machine state ($\Phi5$), to the fourth machine state ($\Phi4$) and back to the second machine state ($\Phi2$) can be referred to as a buck-boost cycle.

A third path for transitioning out of the fourth machine state (444) can occur when the status variable is equal to zero (mode=0), the mode of the converter is enabled (FB=1), and the current through the inductor, as measured via the second transistor 103, has gone to zero. With such conditions, the controller 106 can transition the converter to the third machine state ($\Phi3$). With the status variable set to zero, transitions between the fourth machine state ($\Phi4$) and the third machine state ($\Phi3$) are indicative of a buck mode of operation of the converter (mode=0).

The third machine state ($\Phi3$), like the fifth machine state ($\Phi5$) can allow the input voltage (VIN) to be coupled to the output voltage (VOUT) through the inductor. Upon entering the third machine state ($\Phi3$) the controller 106 can initiate one or more delays including, but not limited to, a minimum current delay and a slope check delay. Upon entering the third machine state ($\Phi3$), the controller 106 can monitor the output of the peak current comparator 110.

A first path of transition out of the third machine state ($\Phi3$) can occur when the peak current comparator 110 indicates that the current through the inductor has reached the peak current threshold. With such conditions, the controller 106 can transition the converter to the fourth machine state ($\Phi4$) to begin to discharge the output voltage (VOUT) and the inductor to ground.

A second path of transition out of the third machine state ($\Phi3$) can occur when after the slope check delay and the minimum current delay, the minimum current delay indicates that the inductor current fell below the minimum current threshold and the peak current comparator 110 indicates that the inductor current did not reach the peak current threshold within the slope check delay. With such conditions, the controller 106 can set the status variable to 1 and can transition the converter from the third machine state ($\Phi3$) to the second machine state ($\Phi2$).

As can be noted from the above description of the hysteretic control method of the converter, the slope of the inductor current is used to change operating modes of the converter. Inductor current slope can be an indication of the relationship between the input voltage (VIN) and the output voltage (VOUT). For example, upon entering certain machine states where the input voltage (VIN) is coupled to the output voltage (VOUT) via the inductor, the change in inductor current, or the slope of the inductor current, after a certain delay, can provide an indication of the relative proximity of the input voltage level and the output voltage level. If the inductor current does not change by an anticipated amount, such a condition can indicate that the input voltage (VIN) and the output voltage (VOUT) are somewhat close in value. Timely detection of such a relationship, such as in the fifth machine state ($\Phi5$) and the third machine state ($\Phi3$) as discussed above can provide quick response compared to other control methods. In addition, the above control method enables comparators only when they are needed, thus saving additional energy.

In certain examples, the delays for minimum current threshold, maximum current threshold, and peak current threshold can be set and can depend on the rating of the converter. In some examples, the slope check delay can depend on the peak current setting, the minimum current setting and the inductance of the converter inductor. In some examples, the slope check delay for the fifth machine state ($\Phi 5$) can be different than for the third machine state ($\Phi 3$). For example, the slope check delay for the fifth machine state ($\Phi 5$) can add to converter stability with a longer delay. However, a longer delay can reduce the converter responsiveness, therefore, setting the slope check delay for the fifth machine state ($\Phi 5$) can depend on design criteria for the application. The slope check delay for the third machine state ($\Phi 3$) can depend on the size of the inductor and the minimum current threshold and the minimum current delay. For example, a converter can have a peak current rating (Ipeak) of 200 mA. In the third machine state ($\Phi 3$), the minimum current delay can be set to 500 ns and minimum current threshold can be 20 m. In an example, for a converter inductor with inductance (L) equal to 4.7 uH, Vin−Vout is at least 20 mA*L/500 ns=0.19V. Therefore, the maximum current threshold ($T_{MAX}$) in the third machine state ($\Phi 3$) can be larger than 20 mA for 500 nsec to guarantee that the slope check will not be false triggered. These values associated with Ipeak, L, minimum current and minimum current delay are illustrative examples only. Other values can be used. Also, unless described otherwise below, the above description of the machine states, transition between states and the variables and parameters used therein apply to the example control schemes discussed below. In general, the slope check delay is used to determine the state of buck-boost or boost, so its delay is related to boost and buck-boost mode. If the delay is 2 us and Ipeak=200 mA, when Vin−Vout<Ipeak*L/Tdealy=0.47V, the converter is in buck-boost mode and when Vin−Vout>0.47V, the converter is in boost mode. The slope check delay in the third machine state ($\Phi 3$) can be different than the slope check delay in the fifth machine state ($\Phi 5$).

Figure 4A:
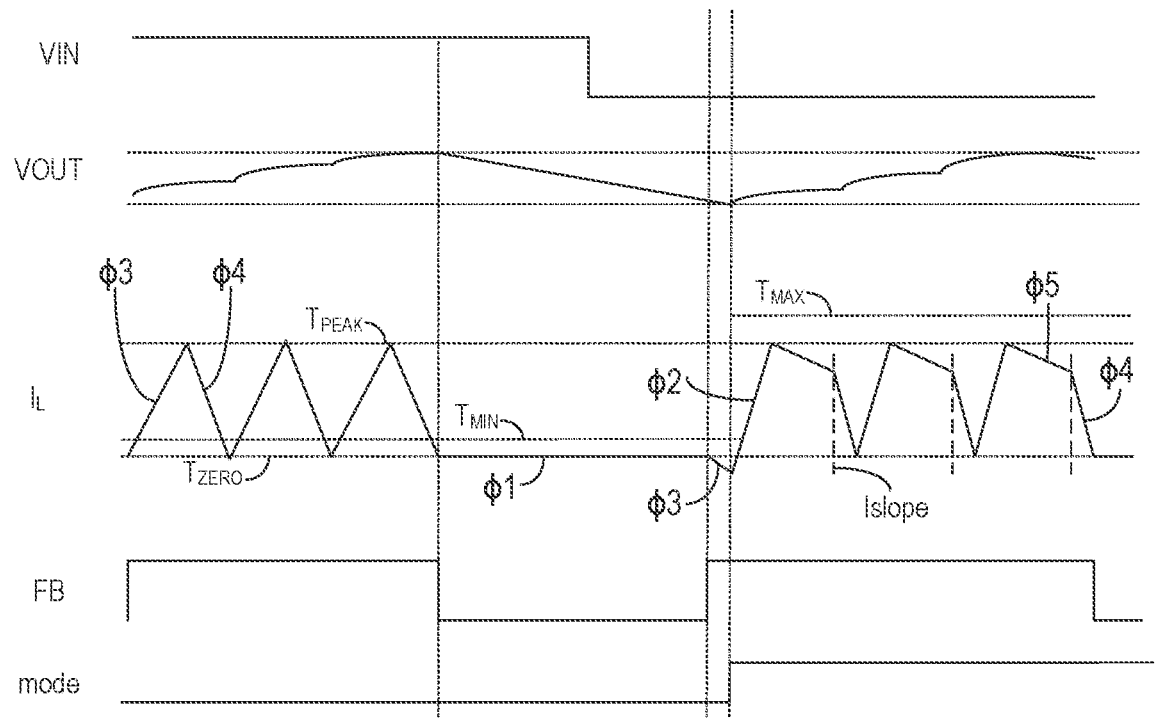
FIGS. 4A and 4B illustrate generally the changes in control function of an example of a converter as the input voltage experiences a step change.
Figure 4B:
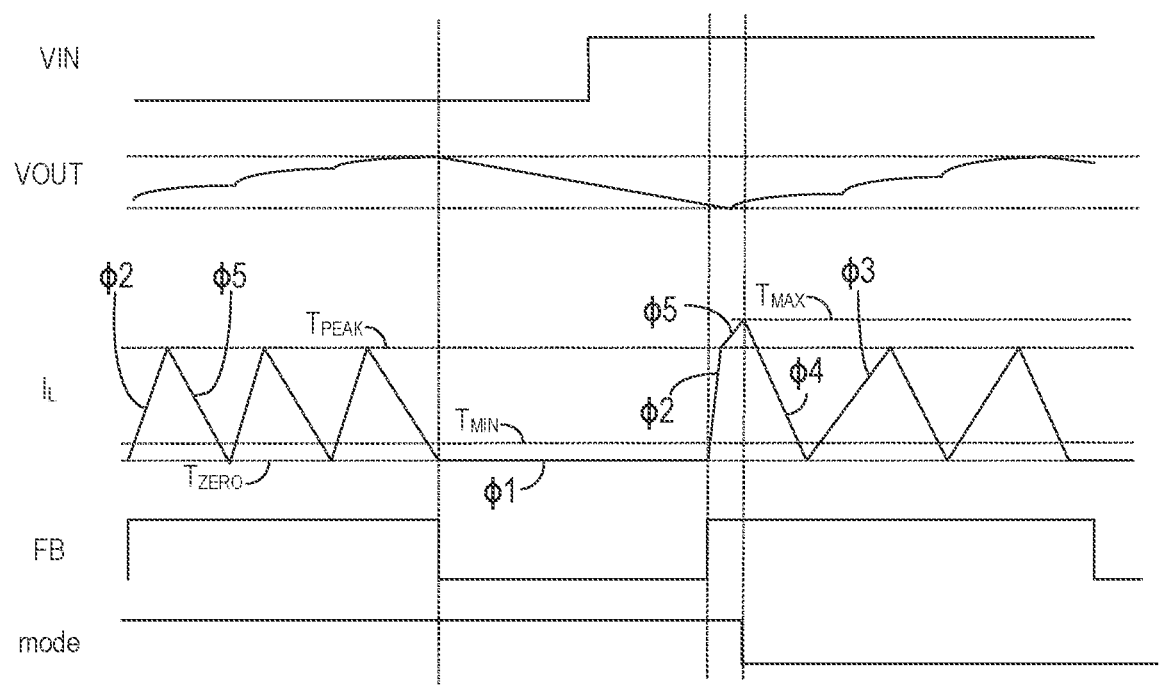

FIGS. 4A and 4B illustrate generally the changes in control function of an example of a voltage converter as the input voltage (VIN) experiences a step change. Similar changes can be observed when the output voltage (VOUT) suddenly changes, for example, due to a sudden change in load. FIGS. 4A and 4B illustrate generally an example of various signals of a hysteretic converter. The various signals include the input voltage (VIN), the output voltage (VOUT), the upper and lower limits of the hysteretic feedback comparator, the inductor current, the feedback signal (FB) for enabling and disabling the switching cycle of the converter, and the status variable (mode) value. With respect to the inductor current (IL), the representative levels of the peak current threshold ($I_{PEAK}$), max current threshold ($I_{MAX}$), minimum current threshold ($I_{MIN}$), and zero current threshold ($I_{ZERO}$) are also shown. FIG. 4A illustrates a step decrease in the input voltage (VIN). In certain examples, such as that illustrated, the converter can change from buck type control to boost type control within one switching cycle to compensate for the change. FIG. 4B illustrates a step increase in the input voltage (VIN). In certain examples, such as that illustrated, the converter can change within one switching cycle from boost type control to buck type control to compensate for the change.

Figure 5:
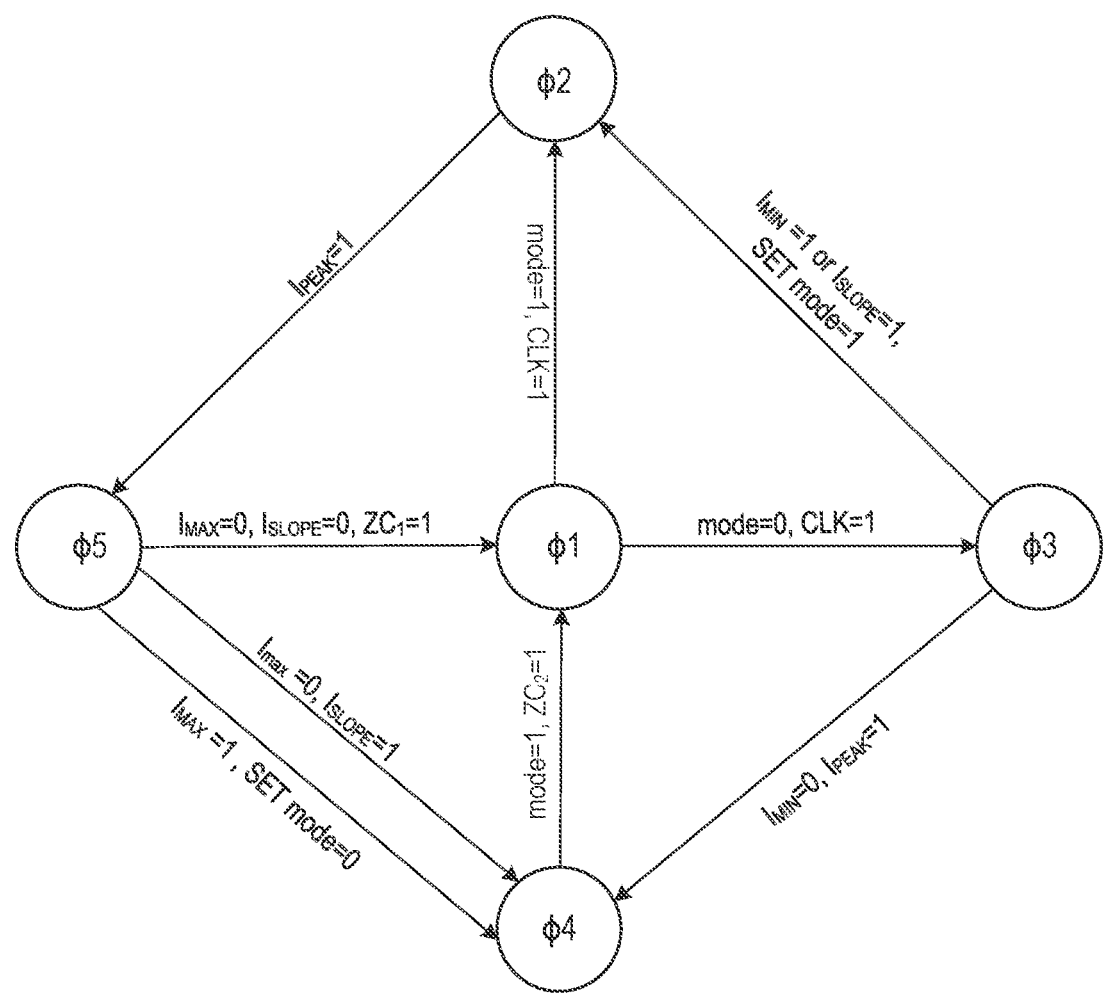
FIG. 5 illustrates generally an example of discontinuous current mode (DCM) control method for a voltage converter.

FIG. 5 illustrates generally an example of discontinuous current mode (DCM) control technique for a voltage converter. For a DCM converter, each converter cycle starts on a transition of a clock. The control technique can use an error amplifier as the feedback device 117. The error amplifier can receive the indication of the output voltage (VOUT) and a feedback reference voltage ($FB_{REF}$) representative of a nominal desired output voltage. The output (FB) of the feedback circuit 114 can be used to provide certain switching thresholds for one or more of the comparators. The converter will return to the first machine state ($\Phi 1$) during each switching cycle. Upon receiving a clock transition, the controller 106 can evaluate the status variable (mode) and can transition control of the converter to the second machine (boost) state ($\Phi 2$) or the third machine (buck) state ($\Phi 3$). As will be seen, the actual value of the status variable can depend on the operation of the converter upon entering the first machine state ($\Phi 1$).

The second machine state ($\Phi 2$) allows the inductor to be coupled between the input voltage supply and ground. During the second machine state ($\Phi 2$), the controller 106 monitors the output of the peak current comparator 110. The peak current comparator 110 can compare the current signal received from the first current sensor coupled to the first switch or first transistor 102 to a predetermined peak current threshold value. As the current through the inductor, represented by the sensed current passing through the first transistor 102, reaches the peak current threshold, the peak current comparator 110 can change states and the controller 106 can transition the converter to the fifth machine state ($\Phi 5$). During the second machine state ($\Phi 2$) the value of the status variable is 1 (mode=1).

The fifth machine ($\Phi 5$) state allows the current stored in the inductor via the second machine state ($\Phi 2$) to be transferred to the output while also coupling the input voltage (VIN) to the output voltage (VOUT) via the inductor. While in the fifth machine state ($\Phi 5$), transitioning to the next state can depend on the relative voltage levels of the input voltage (VIN) and the output voltage (VOUT). Upon entering the fifth machine state ($\Phi 5$), the controller 106 can begin one or more specified delays including, but not limited to, a maximum inductor current delay and a slope check delay. At the conclusion of the maximum inductor current delay, the output of the maximum inductor current comparator can be evaluated. During the fifth machine state ($\Phi 5$), the output of the first zero-current comparator 113 is evaluated. During the fifth machine state the inductor peak current comparator can be disabled.

A first transition path for the converter out of the fifth machine state ($\Phi 5$) can proceed if at or after the conclusion of the inductor maximum delay the inductor maximum delay comparator provides an indication that the inductor current is at or beyond the maximum current threshold. If so, the controller 106 can transition the converter to the fourth machine state ($\Phi 4$). In some examples, upon transitioning to the fourth machine state ($\Phi 4$), the status variable can be changed from a value of 1 to a value of zero indicating the converter is transitioning from a boost mode of operation (mode=1) to a buck mode of operation (mode=0).

A second transition path for the converter out of the fifth machine state ($\Phi 5$) can proceed if the inductor current does not reach or exceed the maximum inductor current threshold and, at the conclusion of the slope check delay, the first zero current comparator 113 provides an indication of whether the inductor current reduces to at or below the inductor zero current threshold. If the inductor current did not reduce to the zero current threshold at the conclusion of the slope check delay, the controller 106 can transition the converter to the fourth machine state ($\Phi 4$). This particular check allows transition out of the fifth state that would not normally occur. The transition based on the slope check delay indicates that as the converter boosts the output voltage (VOUT) relative to the input voltage (VIN), the input voltage (VIN) is at or near the output voltage (VOUT).

A third transition path for operation of the converter out of the fifth machine state (Φ5) and to the first machine state (Φ1) can proceed if the inductor current did reduce to the zero current threshold. Having this condition can return control of the converter to the first machine state (Φ1).

The fourth machine state (Φ4) can allow the collapsing magnetic field of the inductor to supplement the electrical charge stored in the output capacitor 118. Although the output voltage can initially rise during this state, if there is some load on the converter, the output voltage (VOUT) typically will begin to fall at some point during the fourth machine state. Upon entering the fourth machine state (Φ4), the controller 106 can begin to monitor the output of the second zero-current comparator 109. When the output of the second zero-current comparator 109 indicates the current through the inductor 101 has fallen to or below the zero current threshold, the controller 106 can transition from the fourth machine state (Φ4) to the first machine state (Φ1). During the fourth machine state the inductor peak current comparator can be disabled.

The third machine state (Φ3), like the fifth machine state (Φ5) can allow the input voltage (VIN) to be coupled to the output voltage (VOUT) through the inductor 101. In a DCM type converter, the third machine state (Φ3) can be entered from the first machine state (Φ1) upon receiving a clock transition and the status variable indicating a buck mode of operation. Upon entering the third machine state (Φ3), the controller 106 can initiate one or more delays, such as a minimum current delay, a peak current delay, or a slope check delay. A first path of transition out of the third machine state (Φ3) can occur when after conclusion of the peak current delay and the minimum current delay, the minimum current comparator 112 does not indicate that the inductor current fell to or below the minimum current threshold and that the peak current comparator 110 indicates that the current through the inductor 101 has reached the peak current threshold. With such conditions, the controller 106 can transition the converter from the third machine state (Φ3) to the fourth machine state (Φ1) to begin to discharge the output voltage (VOUT) and the inductor 101 to ground.

A second path of transition out of the third machine state (Φ3) can occur when after the slope check delay and the minimum current delay, the minimum current delay indicates that the inductor current fell below the minimum current threshold or, after the slope check delay, the peak current comparator 110 indicates that the inductor current did not reach the peak current threshold. With such conditions, the controller 106 can set the status variable to 1 and can transition the converter from the third machine state (Φ3) to the second machine state (Φ2).

In the DCM control method of the converter, the slope of the inductor current can be used to change operating modes of the converter. Inductor current slope can be an indication of the relationship between the input voltage (VIN) and the output voltage (VOUT). For example, upon entering certain machine states in which the input voltage (VIN) is coupled to the output voltage (VOUT) via the inductor 101, the change in inductor current, or the slope of the inductor current, after a certain delay, can provide an indication of the relative proximity of the input voltage level and the output voltage (VOUT) level. If the inductor current does not change by an anticipated amount, such a condition can indicate that the input voltage (VIN) and the output voltage (VOUT) are somewhat close in value. Timely detection of such a relationship, such as in the fifth machine state (Φ5) and the third machine state (Φ3) as discussed above can provide quick response compared to other control methods. In addition, the above control method can be used to enable comparators only when they are needed, disabling the comparators otherwise, thus, saving additional energy.

In certain examples, the delays for minimum current threshold, maximum current threshold, and peak current threshold can be set and can depend on the rating of the converter. In certain examples, the peak current threshold and the maximum current threshold can depend on the output of the error amplifier of the feedback circuit 114. In some examples, the slope check delay can depend on the peak current setting, the minimum current setting and the inductance of the converter inductor. In some examples, the slope check delay for the fifth machine state (Φ5) can be different than for the third machine state (Φ3). For example, the slope check delay for the fifth machine state (Φ5) can add to converter stability with a longer slope check delay. However, a longer slope check delay can reduce the converter responsiveness, therefore, setting the slope check delay for the fifth machine state (Φ5) can depend on one or more other criteria for the application. The slope check delay check for the third machine state (Φ3) can depend on the size of the inductor 101 and the peak current threshold ($T_{PEAK}$).

Figure 6A:
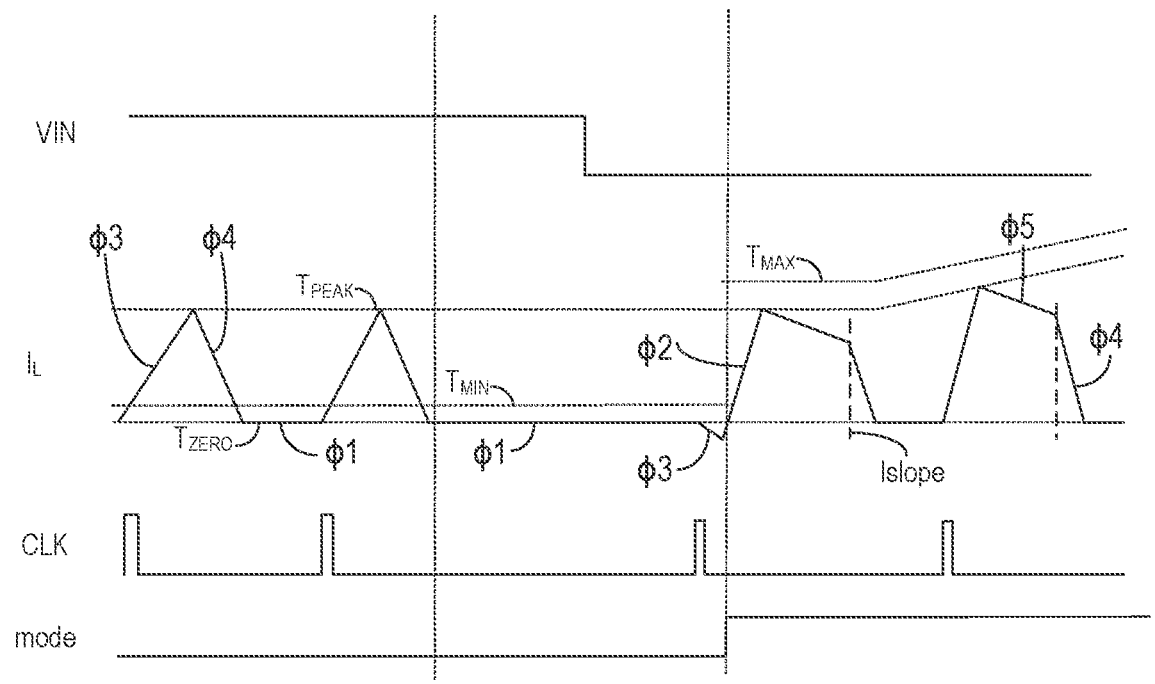
FIGS. 6A and 6B illustrate generally changes in control function of an example DCM converter as the input voltage experiences a step change.
Figure 6B:
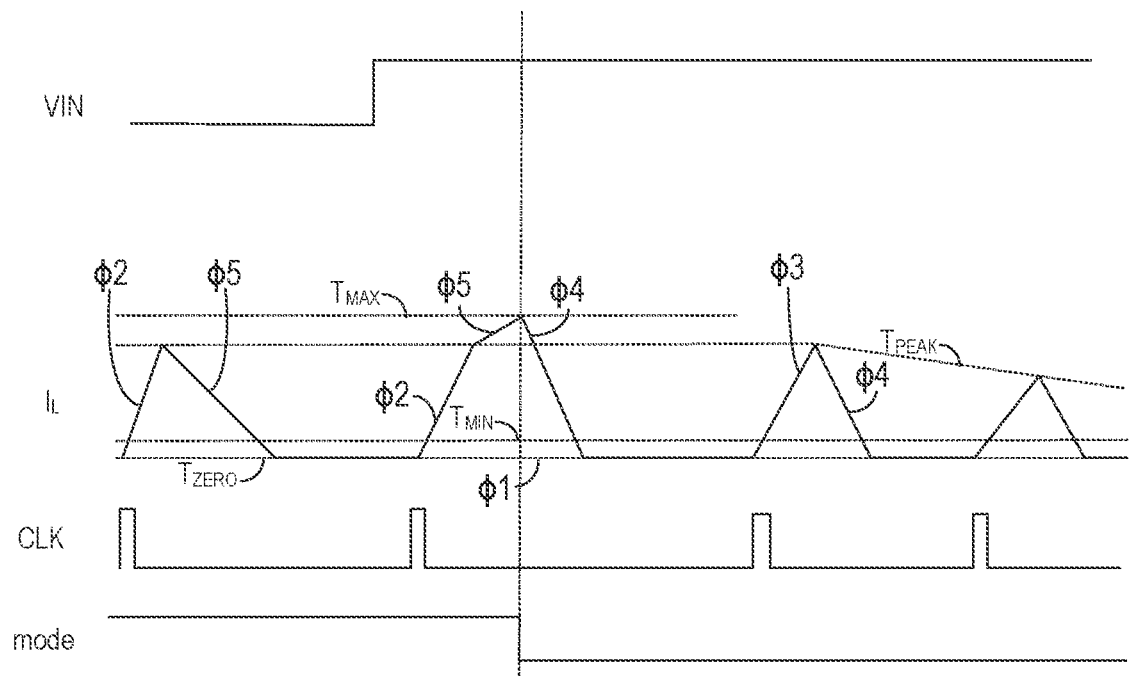

An advantage to the above control based on using the slope of the inductor current or a representation of the slope of the inductor current is that the converter controller 106 can respond to mode changing events within one switching cycle. A switching cycle can begin when control of the converter exits the first machine state and the switching cycle can end when control subsequently enters the first machine state. FIGS. 6A and 6B illustrate generally changes in control function of an example of a DCM converter as the input voltage (VIN) experiences a step change. Similar changes can be observed when the output voltage (VOUT) suddenly changes for example, due to a sudden change in load. FIGS. 6A and 6B illustrate generally various signals of a DCM voltage converter. The various signals include the input voltage (VIN), the inductor current (IL), and the status variable (mode) value. With respect to the inductor current (IL), the representative levels of the peak current threshold ($I_{PEAK}$), max current threshold ($I_{MAX}$), minimum current threshold ($I_{MIN}$), and zero current threshold ($I_{ZERO}$) are also shown. The peak current threshold ($I_{PEAK}$) and the maximum current threshold ($I_{MAX}$) can depend on the feedback information (FB) from the error amplifier. In some examples, maximum current threshold ($I_{MAX}$) can equal the peak current threshold ($I_{PEAK}$) plus an offset. FIG. 6A illustrates a step decrease in the input voltage (VIN). In certain examples, such as that illustrated, the converter can change in one switching cycle from buck type control to boost type control to compensate for the change. The slope check delay (Islope) can allow smooth transition between boost and buck machine states during a boost-buck switching cycle. FIG. 6B illustrates a step increase in the input voltage (VIN). In certain examples, such as that illustrated, the converter can change in one switching cycle from boost type control to buck type control to compensate for the change.

Figure 7:
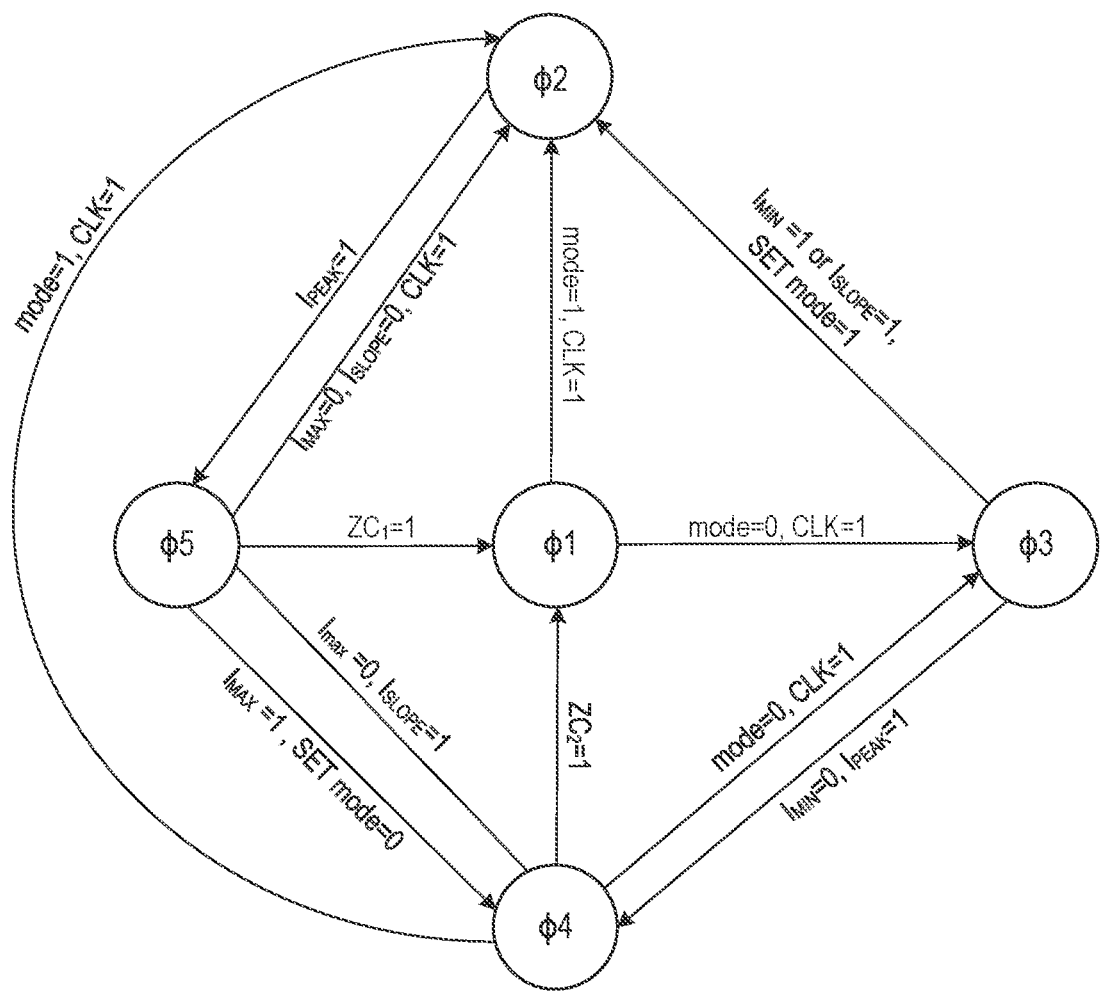
FIG. 7 illustrates general an example of a fast pulse width modulation (FPWM) control method for a voltage converter.

FIG. 7 illustrates general an example of a fast pulse width modulation (FPWM) control method for a voltage converter according to the present subject matter. For a FPWM converter, each converter cycle starts on a transition of a clock. In certain examples, the method uses an error amplifier as the feedback device 117. The error amplifier can receive the indication of the output voltage (VOUT) and a feedback reference voltage ($FB_{REF}$) representative of a nominal desired output voltage. The output (FB) of the feedback circuit 114 can be used to provide certain switching thresholds for one or more of the comparators. For purposes of discussion, assume the converter has returned to the first machine state. Upon reception of a clock transition, the controller 106 can evaluate the status variable (mode) and transition control of the converter to the second machine (boost) state (Φ2) or the third machine (buck) state (Φ3). As will be seen, the actual value of the status variable (mode) can depend on the operation of the converter upon entering the first machine state.

The second machine state (Φ2) allows the inductor 101 to be coupled between the input voltage supply and ground and the controller 106 can monitor the output of the peak current comparator 110. In certain examples, the peak current comparator 110 can compare the current signal received from the first current sensor coupled to transistor switch 1 to a predetermined peak current threshold. As the current through the inductor 101, represented by the sensed current passing through the first transistor 102, reaches the peak current threshold, the peak current comparator 110 can change states and the controller 106 can transition to the fifth machine state (Φ5). In certain examples, the peak current threshold, as well as the maximum current threshold can include a slope compensation component. During the second machine state (Φ2) the value of the status variable (mode) is 1.

The fifth machine state (Φ5) allows the current stored in the inductor 101 via the second machine state (Φ2) to be transferred to the output while also coupling the input voltage (VIN) to the output voltage (VOUT) via the inductor 101. While in the fifth machine state (Φ5), transitioning to the next state can depend on the relative voltage levels of the input voltage (VIN) and the output voltage (VOUT). Upon entering the fifth machine state (Φ5), the controller 106 can begin one or more delays including, but not limited to, a maximum inductor current delay and a slope check delay. At the conclusion of the maximum inductor current delay, the output of the maximum inductor current comparator is evaluated. In certain examples, the controller 106 can monitor the actual value of the inductor current as represented by an output of a current sensor of one of switches and can record the low current, or valley, of the inductor current. During the fifth machine state (Φ5), the output of the first zero-current comparator 113 is evaluated. During the fifth machine state the inductor peak current comparator can be disabled.

A first transition path out of the fifth machine state (Φ5) can occur if the input voltage (VIN) is substantially larger than the output voltage (VOUT). In such a situation, the inductor current can continue to rise past the peak current threshold such that the maximum current comparator 111 indicates the inductor current has reached or exceeded the maximum inductor current threshold. In addition, the controller 106 can change the status variable (mode) from a value of 1 to a value of zero indicating the converter is transitioning from a boost mode of operation (mode=1) to a buck mode of operation (mode=0) and can transition the converter from the fifth machine state (Φ5) to the fourth machine state (Φ4). The inductor minimum current threshold ($T_{MIN}$) is equal to the inductor valley current plus an offset. If this is an initial switching cycle, the valley current defaults to zero.

A second transition path for the converter out of the fifth machine state (Φ5) can proceed if the inductor current does not reach or exceed the maximum inductor current threshold and at the conclusion of the slope check delay, the inductor current can be compared to Ipeak−Islope. In certain examples, the comparison can be made using an additional, optional comparator 119. In some examples, the minimum current comparator can be repurposed during the fifth machine state by adjusting the minimum current threshold ($T_{MIN}$) to a value representative of Ipeak−Islope. If at the conclusion of the slope check delay, the inductor current is larger than Ipeak−Islope, the controller 106 can transition the converter to the fourth machine state (Φ4). This particular check allows transition out of the fifth machine state (Φ5) that would not normally occur. The transition based on the slope check delay indicates that as the converter boosts the output voltage (VOUT) relative to the input voltage (VIN), the input voltage (VIN) is at or near the output voltage (VOUT). If the inductor current has not reduce to Ipeak−Islope and a new clock signal is received, the controller 106 can transition from the fifth machine state (Φ5) to the second machine state (Φ2).

A third transition path for operation of the converter out of the fifth machine state (Φ5) and to the first machine state (Φ1) can proceed if the first zero current comparator 113 indicates that the inductor current has passed below the zero current threshold. In a FPWM type control scheme, the zero current threshold can provide an indication that the current through the inductor 101 is negative.

The fourth machine state (Φ4) can allow the collapsing magnetic field of the inductor 101 to supplement the electrical charge stored in the output capacitor 118. The fourth machine state (Φ4) indicates that the converter is in a buck mode of operation or in a buck switching cycle of a buck-boost mode of operation. Upon entering the fourth machine state (Φ4), the controller 106 can monitor for negative inductor current using the second zero current comparator 109 and can proceed to the first machine state (Φ1) if such a condition exists. If a negative inductor current is not detected, the converter can remain in the fourth machine state until a clock pulse or clock signal transition is received. Upon reception of the clock pulse or transition, and if the status variable (mode) is equal to zero (buck mode) the controller 106 can transition the converter to the third machine state (Φ3). Upon reception of the clock pulse or transition, and the status variable is equal to 1 (boost or buck-boost mode) the controller 106 can transition the converter to the second machine state (Φ2).

The third machine state (Φ3), like the fifth machine state (Φ5), can allow the input voltage (VIN) to be coupled to the output voltage (VOUT) through the inductor 101. In a FPWM type converter, the third machine state (Φ3) can be entered from the first machine state (Φ1) upon receiving a clock transition and the status variable (mode) indicating a buck mode of operation. Upon entering the third machine state (Φ3), the controller 106 can initiate one or more delays including, but not limited to, a minimum current delay and a slope check delay. A first path of transition out of the third machine state (Φ3) can occur when after conclusion of the minimum current delay, the minimum current comparator 112 does not indicate that the inductor current fell to or below the minimum current threshold and that the peak current comparator 110 indicates that the current through the inductor 101 has reached the peak current threshold. With such conditions, the controller 106 can transition the converter from the third machine state (Φ3) to the fourth machine state (Φ4) to begin to discharge the output voltage (VOUT) and the inductor 101 to ground.

A second path of transition out of the third machine state (Φ3) can occur when after the slope check delay and the minimum current delay, the minimum current delay indicates that the inductor current fell to or below the minimum current threshold or, after the slope check delay, the peak current comparator 110 indicates that the inductor current did not reach the peak current threshold. With such conditions, the controller 106 can set the status variable to 1 and can transition the converter from the third machine state (Φ3) to the second machine state (Φ2). In certain examples, the minimum current threshold can be the latest valley current received at the controller 106 plus an offset.

As can be noted from the above description of the FPWM control method of the converter, the slope of the inductor current is used to change operating modes of the converter. Inductor current slope can be an indication of the relationship between the input voltage (VIN) and the output voltage (VOUT). For example, upon entering certain machine states where the input voltage (VIN) is coupled to the output voltage (VOUT) via the inductor 101, the change in inductor current, or the slope of the inductor current, after a certain delay, can provide an indication of the relative proximity of the input voltage level and the output voltage level. If the inductor current does not change by an anticipated amount, such a condition can indicate that the input voltage (VIN) and the output voltage (VOUT) are somewhat close in value. Timely detection of such a relationship, such as in the fifth machine state (Φ5) and the third machine state (Φ3) as discussed above can provide quick response compared to other control methods. In addition, the above control method enables comparators only when they are needed, thus, saving additional energy.

In certain examples, the delays for minimum current threshold and peak current threshold can be set and can depend on the rating of the converter. In certain examples, the peak current threshold and the maximum current threshold can depend on the output of the error amplifier of the feedback circuit 114. In some examples, the slope check delay can depend on the peak current setting, the minimum current setting and the inductance of the converter inductor. In some examples, the slope check delay for the fifth machine state (Φ5) can be different than for the third machine state (Φ3). For example, the slope check delay for the fifth machine state (Φ5) typically can add to converter stability with a longer delay. However, a longer delay can reduce the converter responsiveness, therefore, setting the slope check delay for the fifth machine state (Φ5) can depend on design criteria for the application. The slope check delay check for the third machine state (Φ3) can depend on the size of the inductor 101 and the minimum current threshold and the minimum current delay. In certain examples of a FPWM converter, the reference voltages for the maximum and peak current comparators 110, 111 can be summed with a slope compensation signal to assist with stability of the converter 100.

Figure 8A:
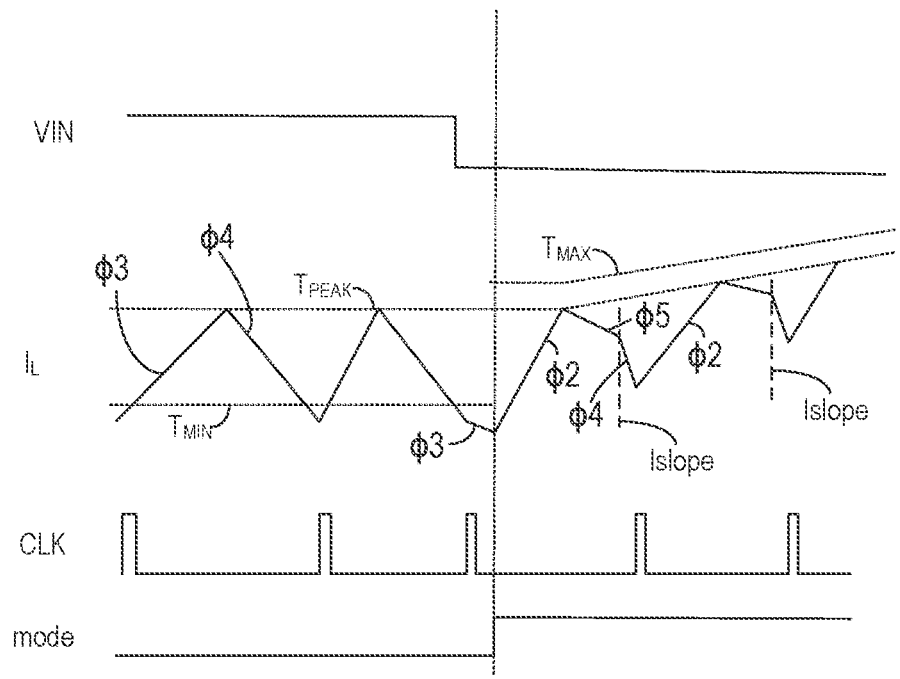
FIGS. 8A and 8B illustrate generally various signals of a hysteretic converter.
Figure 8B:
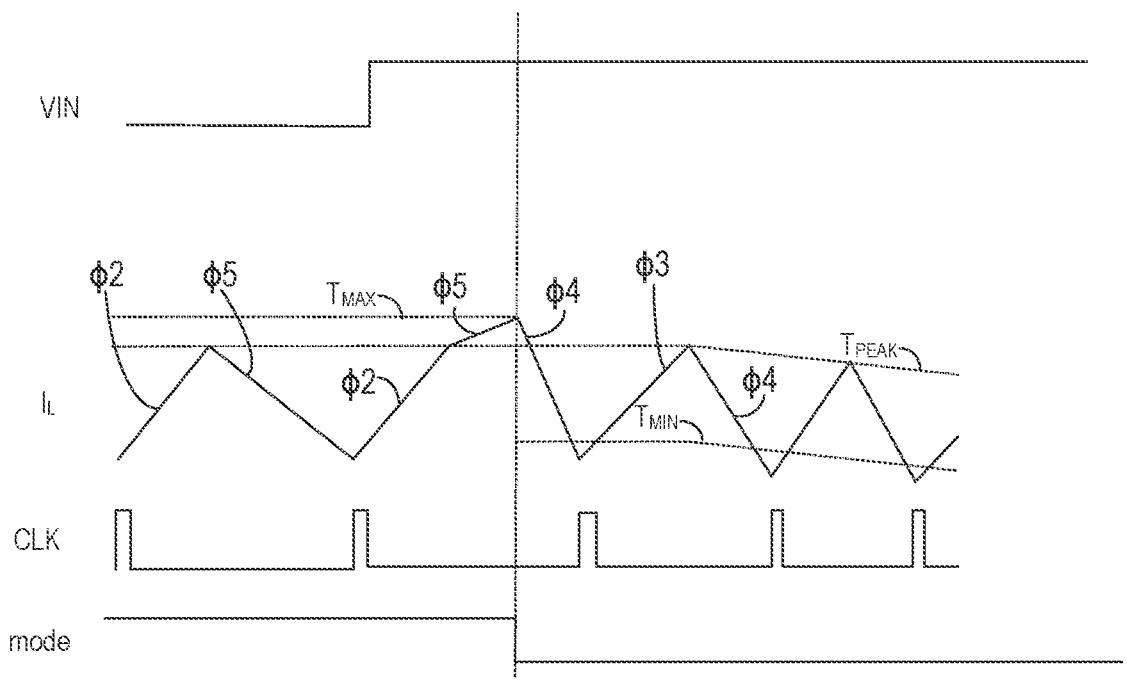

FIGS. 8A and 8B illustrate generally various signals of a hysteretic converter. The various signals include the input voltage (VIN), the inductor current (IL), the clock signal (clock), and the status variable (mode) value. With respect to the inductor current (IL), the representative levels of the peak current threshold ($I_{PEAK}$), max current threshold ($I_{MAX}$), minimum current threshold ($I_{MIN}$), and valley current ($I_{VALLEY}$) are also shown. In certain examples, the peak current threshold ($I_{PEAK}$) and the maximum current threshold ($I_{MAX}$) can depend on the feedback information (FB) from the error amplifier. In some examples, maximum current threshold ($I_{MAX}$) can equal the peak current threshold ($I_{PEAK}$) plus an offset. For example. For example, $$I_{peak} = kFB,$$

$$I_{MAX} = kFB + \text{offset}_{MAX},$$

where k is a scaling value that can be related to circuitry of the current sensor. In certain examples, the minimum inductor current threshold can equal the valley current of a previous switching cycle plus an offset. For example, $$I_{MIN} = kI_{VALLEY} + \text{offset}_{MIN},$$

where k is a scaling value that can be related to circuitry of the current sensor. FIG. 8A illustrates a step decrease in the input voltage (VIN). In certain examples, such as that illustrated, the converter can change in one switching cycle from buck type control to boost type control to compensate for the change. FIG. 8B illustrates a step increase in the input voltage (VIN). In certain examples, such as that illustrated, the converter can change in one switching cycle from boost type control to buck type control to compensate for the change.

Various Notes & Examples

In Example 1, a method of operating a switched-mode DC-DC voltage converter can include, during a first machine state, isolating an output voltage terminal of the converter from an inductor of the DC-DC voltage converter and from a ground potential, during a second machine state, establishing inductor current in an inductor of the converter using an input voltage supply, a first transistor and a third transistor, during a third machine state or during a fifth machine state, coupling the input voltage supply to the output voltage terminal via the inductor using the first transistor and a fourth transistor, during a fourth machine state, coupling the output voltage terminal to the ground potential via the inductor using a second transistor and the fourth transistor, and transitioning from the fifth machine state to the fourth machine state when a slope of the inductor current over a first slope check delay period is less than a first slope threshold.

In Example 2, the transitioning from the fifth machine state to the fourth machine state of Example 1 optionally includes transitioning from the fifth machine state to the fourth machine state when a slope of the inductor current over a slope check delay is less than a slope threshold and the inductor current does not reach a maximum current threshold during the slope check delay.

In Example 3, the method of any one or more of Examples 1-2 optionally includes transitioning from the third machine state to the second machine state when a slope of the inductor current over a second slope check delay is less than a second slope threshold.

In Example 4, the method of any one or more of Examples 1-3 optionally includes comparing an indication of a voltage at the output voltage terminal to a feedback reference at a hysteretic comparator of the DC-DC voltage converter to provide feedback information, and not transitioning to the first machine state when the feedback information is in a first state.

In Example 5, the method of any one or more of Examples 1-4 optionally includes transitioning from the fourth machine state or the fourth machine state to the first machine state when the feedback information is in a second state.

In Example 6, the method of any one or more of Examples 1-5 optionally includes receiving a clock signal at a controller of the DC-DC voltage converter and transitioning from the first machine state using a first edge of the clock signal.

In Example 7, the method of any one or more of Examples 1-6 optionally includes transitioning from the fifth machine state to the second machine state using a second edge of the clock signal.

In Example 8, the method of any one or more of Examples 1-7 optionally includes transitioning from the fourth machine state to the third machine state using a third edge of the clock signal.

In Example 9, a control circuit of a voltage converter can include a controller circuit configured to control current through an inductor of the voltage converter using four switches coupled to the inductor, a current slope check delay generator configured to generate a current slope check delay, wherein the controller circuit is configured to initiate the current slope check delay when the inductor is coupled to an input voltage via a first switch of the four switches and to an output voltage via a fourth switch of the four switches, to compare a level of current through the inductor at the conclusion of the current slope check delay with a reference current level, to set a current slope variable based on the comparison of the level with the reference current level, and to change a machine state of the controller based on a first state of the current slope variable.

In Example 10, the controller of any one or more of Examples 1-9 optionally is configured to operate in one of a plurality of machine states, the plurality of machine states including a first machine state wherein the controller is configured to set at least the first switch, a second switch and a third switch of the four switches in a high impedance state, a second machine state wherein the controller is configured to set the first switch and the third switch in a low impedance state, the first switch configured to couple the input voltage with a first node of the inductor in the low impedance state and the third switch is configured to couple a second node of the inductor with ground in the low impedance state, a third machine state wherein the controller is configured to set the first switch and the fourth switch in the low impedance state, the first switch configured to couple the input voltage with the first node of the inductor in the low impedance state and the fourth switch is configured to couple the second node of the inductor with the output voltage in the low impedance state, a fourth machine state wherein the controller is configured to set the second switch and the fourth switch in the low impedance state, the second switch configured to couple the first node of the inductor with ground in the low impedance state and the fourth switch is configured to couple the second node of the inductor with the output voltage in the low impedance state, and a fifth machine state wherein the controller is configured to set the first switch and the fourth switch in the low impedance state, the first switch configured to couple the input voltage with the first node of the inductor in the low impedance state and the fourth switch is configured to couple the second node of the inductor with the output voltage in the low impedance state.

In Example 11, the control circuit of any one or more of Examples 1-10 optionally includes a hysteretic comparator configured to receive an indication of a level of the output voltage and to compare the indication to a reference voltage window, and wherein the controller is configured to change from the fourth machine state to the first machine state if the indication of a level of the output voltage is at or above an upper limit of the reference window during the fourth state.

In Example 12, the control circuit of any one or more of Examples 1-11 optionally includes a hysteretic comparator configured to receive an indication of a level of the output voltage, to compare the indication to a reference voltage window, and to change from the fifth machine state to the first machine state if the indication of a level of the output voltage is at or above an upper limit of the reference window during the fourth state.

In Example 13, the controller of any one or more of Examples 1-12 optionally is configured to transition from the third machine state to the second machine state when the current slope variable is in the first state.

In Example 14, the control circuit of any one or more of Examples 1-13 optionally includes a peak inductor current comparator configured to receive an indication of the inductor current and to compare the indication to a reference peak current level, and wherein the controller is configured to set the current slope variable to the first state during the third machine state if the indication is lower than the reference peak current level at the conclusion of the current slope check delay.

In Example 15, the controller of any one or more of Examples 1-14 optionally is configured to transition from the fifth machine state to the fourth machine state when the current slope variable is in the first state.

In Example 16, the control circuit of any one or more of Examples 1-3 optionally includes a zero current comparator circuit configured to receive an indication of the inductor current and to compare the indication to a threshold zero current level, and wherein the controller is configured to set the current slope variable to the first state during the fifth machine state if the indication is above the threshold zero current level at the conclusion of the current slope check delay.

In Example 17, a switched-mode DC-DC voltage converter can include an inductor, at least four switches coupled to the inductor and configured to direct current through the inductor to provide a desired output voltage at an output voltage terminal of the voltage converter using an input voltage supply and a ground reference of the converter, and a controller circuit, configured to receive an indication of inductor current through the inductor and to use the slope of the inductor current to control a change between two operating modes of a group of operating modes that include a boost operating mode, a buck operating mode, and a buck-boost operating mode.

In Example 18, the controller of any one or more of Examples 1-17 optionally is configured to control the at least four switches during, and between transitions of, at least five machine states of the switched-mode DC-DC voltage converter.

In Example 19, during a first machine state, the control circuit of any one or more of Examples 1-18 optionally is configured to isolate the output voltage terminal of the converter from the inductor and from the ground potential, during a second machine state, the control circuit of any one or more of Examples 1-18 optionally is configured to establish the inductor current in the inductor using the input voltage supply, a first switch of the at least four switches and a third switch of the at least four switches, during a third machine state or during a fifth machine state, the control circuit of any one or more of Examples 1-18 optionally is configured to couple the input voltage supply to the output voltage terminal via the inductor using the first switch and a fourth switch of the at least four switches, and during a fourth machine state, the control circuit of any one or more of Examples 1-18 optionally is configured to couple the output voltage terminal to the ground potential via the inductor using a second switch of the at least four switches and the fourth switch.

In Example 20, the control circuit of any one or more of Examples 1-19 optionally is configured to transition from the fifth machine state to the fourth machine state when the slope of the inductor current over a first slope check delay period is less than a first slope threshold.

In Example 21, the control circuit of any one or more of Examples 1-18 optionally is configured to transition from the third machine state to the second machine state when the slope of the inductor current over a first slope check delay period is less than a first slope threshold.

Example 22 can include, or can optionally be combined with any portion or combination of any portions of any one or more of Examples 1 through 21 to include, subject matter that can include means for performing any one or more of the functions of Examples 1 through 21, or a machine-readable medium including instructions that, when performed by a machine, cause the machine to perform any one or more of the functions of Examples 1 through 21.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of operating a switched-mode DC-DC voltage converter, the method comprising:
    during a first machine state, isolating an output voltage terminal of the converter from an inductor of the DC-DC voltage converter and from a ground potential;
    during a second machine state, establishing inductor current in an inductor of the converter using an input voltage supply, a first transistor and a third transistor;
    during a third machine state or during a fifth machine state, coupling the input voltage supply to the output voltage terminal via the inductor using the first transistor and a fourth transistor;
    during a fourth machine state, coupling the output voltage terminal to the ground potential via the inductor using a second transistor and the fourth transistor; and
    transitioning from the fifth machine state to the fourth machine state in response to a slope of the inductor current over a first slope check delay period being less than a first slope threshold.

2. The method of claim 1, wherein the transitioning from the fifth machine state to the fourth machine state includes transitioning from the fifth machine state to the fourth machine state in response to the slope of the inductor current over the first slope check delay being less than the first slope threshold and the inductor current does not reach a maximum current threshold during the first slope check delay.

3. The method of claim 1, including transitioning from the third machine state to the second machine state in response to the slope of the inductor current over a second slope check delay being less than a second slope threshold.

4. The method of claim 1, including:
    comparing an indication of a voltage at the output voltage terminal to a feedback reference at a hysteretic comparator of the DC-DC voltage converter to provide feedback information; and not transitioning to the first machine state in response to a first state of the feedback information.

5. The method of claim 4, including transitioning from the fourth machine state or the fifth machine state to the first machine state in response to a second state of the feedback information.

6. The method of claim 1, including receiving a clock signal at a controller of the DC-DC voltage converter; and
transitioning from the first machine state using a first edge of the clock signal.

7. The method of claim 6, including transitioning from the fifth machine state to the second machine state using a second edge of the clock signal.

8. The method of claim 7, including transitioning from the fourth machine state to the third machine state using a third edge of the clock signal.

9. A control circuit of a voltage converter, the control circuit comprising:
a controller circuit configured to control current through an inductor of the voltage converter using four switches coupled to the inductor; and
a current slope check delay generator configured to generate a current slope check delay, based on a detected slope of the current through the inductor, for delaying measurement of the current through the inductor,
wherein the controller circuit is configured to initiate the current slope check delay when the inductor is coupled to an input voltage via a first switch of the four switches and to an output voltage terminal via a fourth switch of the four switches, to compare a level of current of the inductor to the output voltage terminal at the conclusion of the current slope check delay with a reference current level, to set a current slope variable based on the comparison of the level with the reference current level, and to change a machine state of the controller based on a first state of the current slope variable,
wherein the controller is configured to operate in one of a plurality machine states, the plurality of machine states including:
a first machine state wherein the controller is configured to operate the four switches to isolate the output voltage terminal of the converter from the inductor and from a ground potential;
a second machine state wherein the controller is configured to operate the four switches to establish current in the inductor;
a third machine state wherein the controller is configured to operate the four switches to couple the input voltage to the output voltage terminal via the inductor;
a fourth machine state wherein the controller is configured to couple the output voltage terminal via the inductor; and
a fifth machine state wherein the controller is configured to operate the four switches to couple the input voltage to the output voltage terminal via the inductor;
wherein the controller is configured to transition from the fifth machine state to the fourth machine state in response to the first state of the current slope variable is in the first state.

10. The control circuit of claim 9, wherein the plurality of machine states further including:
the first machine state wherein the controller is configured to set at least the first switch, a second switch and a third switch of the four switches in a high impedance state;
the second machine state wherein the controller is configured to set the first switch and the third switch in a low impedance state, the first switch configured to couple the input voltage with a first node of the inductor in the low impedance state and the third switch is configured to couple a second node of the inductor with ground in the low impedance state;
the third machine state wherein the controller is configured to set the first switch and the fourth switch in the low impedance state, the first switch configured to couple the input voltage with the first node of the inductor in the low impedance state and the fourth switch is configured to couple the second node of the inductor with the output voltage in the low impedance state;
the fourth machine state wherein the controller is configured to set the second switch and the fourth switch in the low impedance state, the second switch configured to couple the first node of the inductor with ground in the low impedance state and the fourth switch is configured to couple the second node of the inductor with the output voltage in the low impedance state; and
the fifth machine state wherein the controller is configured to set the first switch and the fourth switch in the low impedance state, the first switch configured to couple the input voltage with the first node of the inductor in the low impedance state and the fourth switch is configured to couple the second node of the inductor with the output voltage in the low impedance state.

11. The control circuit of claim 10, including a hysteretic comparator configured to receive an indication of a level of the output voltage and to compare the indication to a reference voltage window; and
wherein the controller is configured to change from the fourth machine state to the first machine state if the indication of a level of the output voltage is at or above an upper limit of the reference window during the fourth state.

12. The control circuit of claim 10, including a hysteretic comparator configured to receive an indication of a level of the output voltage, to compare the indication to a reference voltage window, and to change from the fifth machine state to the first machine state if the indication of a level of the output voltage is at or above an upper limit of the reference window during the fourth state.

13. The control circuit of claim 10, wherein the controller is configured to transition from the third machine state to the second machine state in response to a first state of the current slope variable.

14. The control circuit of claim 13, including a peak inductor current comparator configured to receive an indication of the inductor current and to compare the indication to a reference peak current level; and
wherein the controller is configured to set the current slope variable to the first state during the third machine state if the indication is lower than the reference peak current level at the conclusion of the current slope check delay.

15. The control circuit of claim 10, including a zero current comparator circuit configured to receive an indication of the inductor current and to compare the indication to a threshold zero current level; and
wherein the controller is configured to set the current slope variable to the first state during the fifth machine state if the indication is above the threshold zero current level at the conclusion of the current slope check delay.

16. A switched-mode DC-DC voltage converter, comprising:

an inductor;

at least four switches coupled to the inductor and configured to direct current through the inductor to provide a desired output voltage at an output voltage terminal of the voltage converter using an input voltage supply and a ground reference of the converter; and a controller circuit, configured to receive an indication of inductor current through the inductor, to use the slope of the inductor current to control a change between two operating modes of a group of operating modes that include a boost operating mode, a buck operating mode, and a buck-boost operating mode; and to control the at least four switches during, and between transitions of, at least five machine states of the switched-mode DC-DC voltage converter;

wherein, during a first machine state, the control circuit is configured to isolate the output voltage terminal of the converter from the inductor and from the ground potential;

wherein, during a second machine state, the control circuit is configured to establish the inductor current in the inductor using the input voltage supply, a first switch of the at least four switches and a third switch of the at least four switches;

wherein, during a third machine state or during a fifth machine state, the control circuit is configured to couple the input voltage supply to the output voltage terminal via the inductor using the first switch and a fourth switch of the at least four switches;

wherein, during a fourth machine state, the control circuit is configured to couple the output voltage terminal to the ground potential via the inductor using a second switch of the at least four switches and the fourth switch; and wherein the control circuit is configured to transition from the fifth machine state to the fourth machine state in response to the slope of the inductor current over a first slope check delay period being less than a first slope threshold.

17. The switched-mode DC-DC voltage converter of claim 16, wherein the control circuit is configured to transition from the third machine state to the second machine state in response to the slope of the inductor current over a first slope check delay period being less than a first slope threshold.

* * * * *